Nov. 15, 1938.　　　　S. O. STAGEBERG　　　　2,137,186
VEHICLE CONSTRUCTION
Filed Feb. 19, 1934　　　4 Sheets-Sheet 1
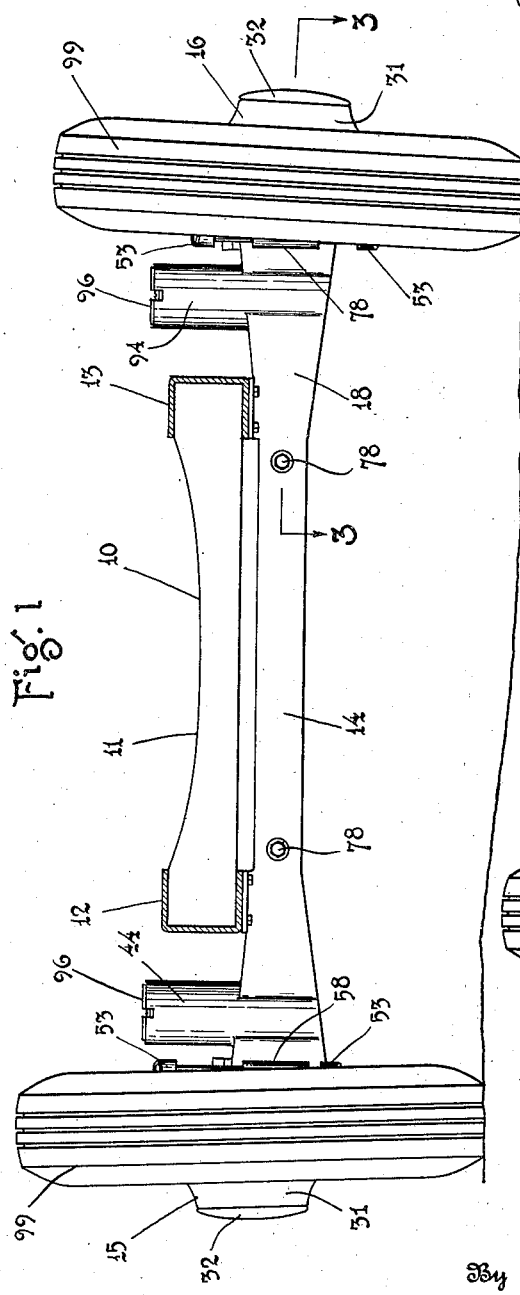
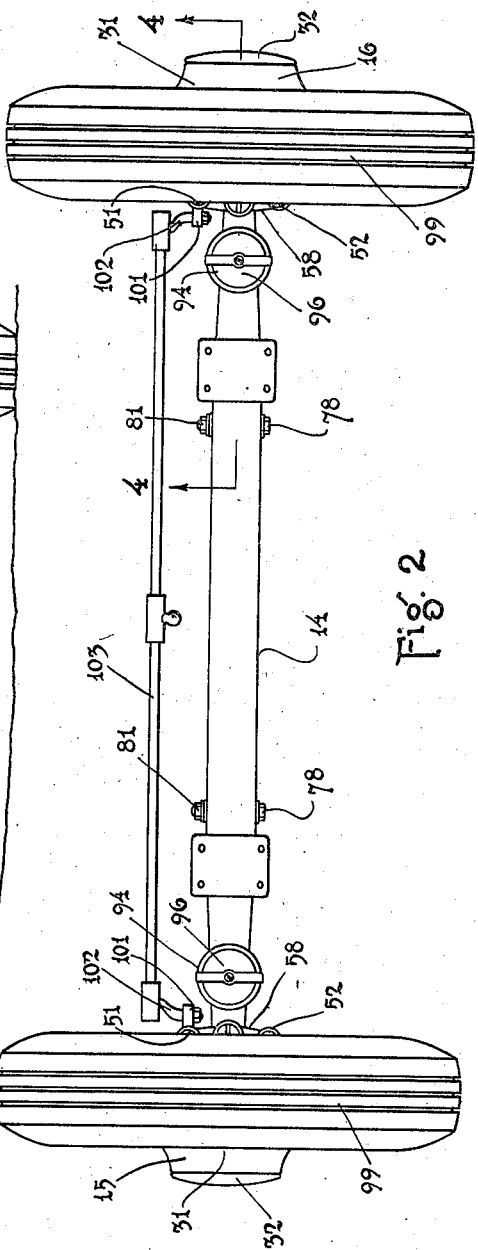
Inventor
Sterling O. Stageberg
By Caswell & Lagaard
Attorneys Nov. 15, 1938.      S. O. STAGEBERG      2,137,186
VEHICLE CONSTRUCTION
Filed Feb. 19, 1934      4 Sheets-Sheet 2

Inventor
Sterling O. Stageberg
By Caswell & Lagaard
Attorneys

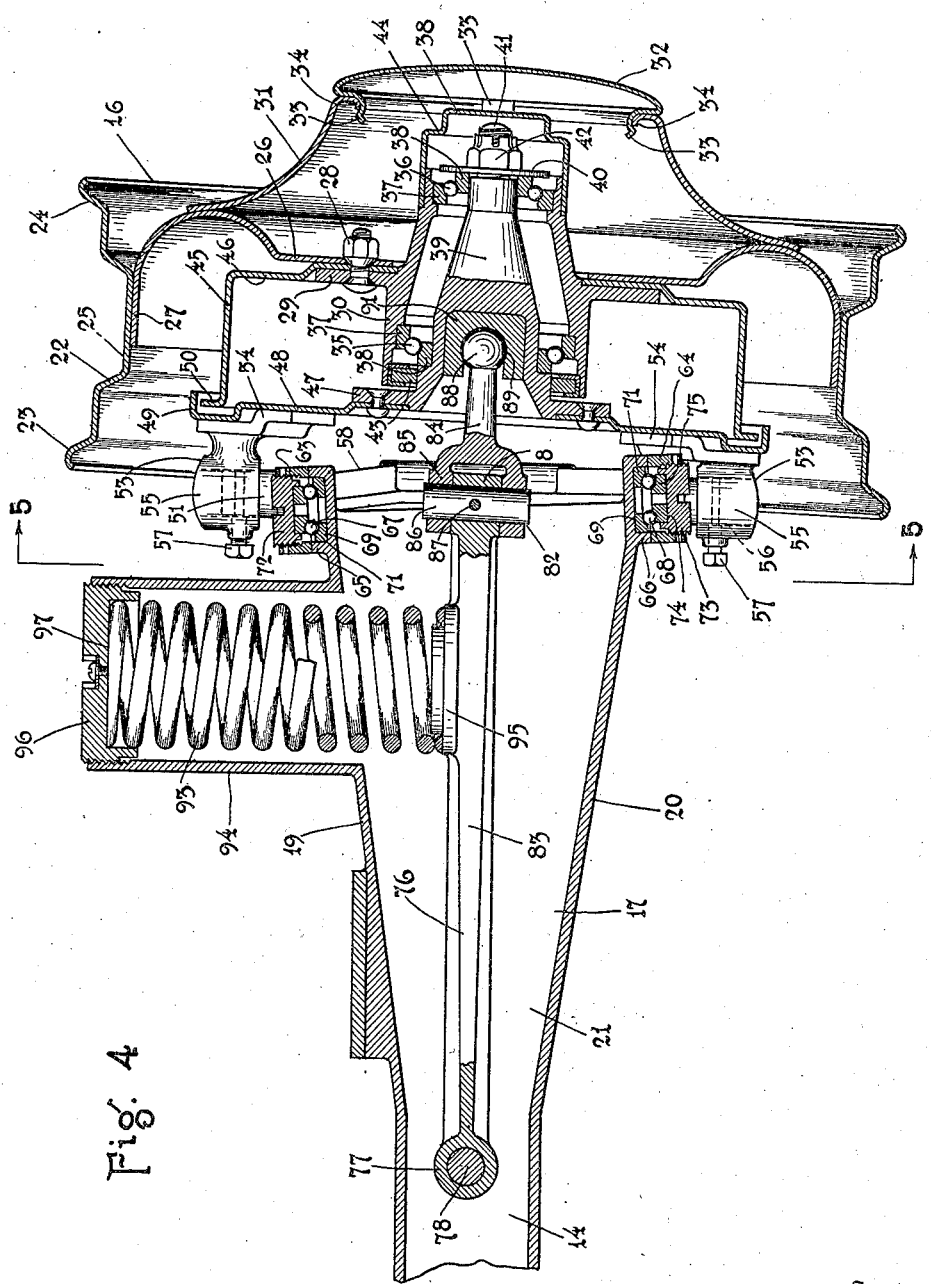

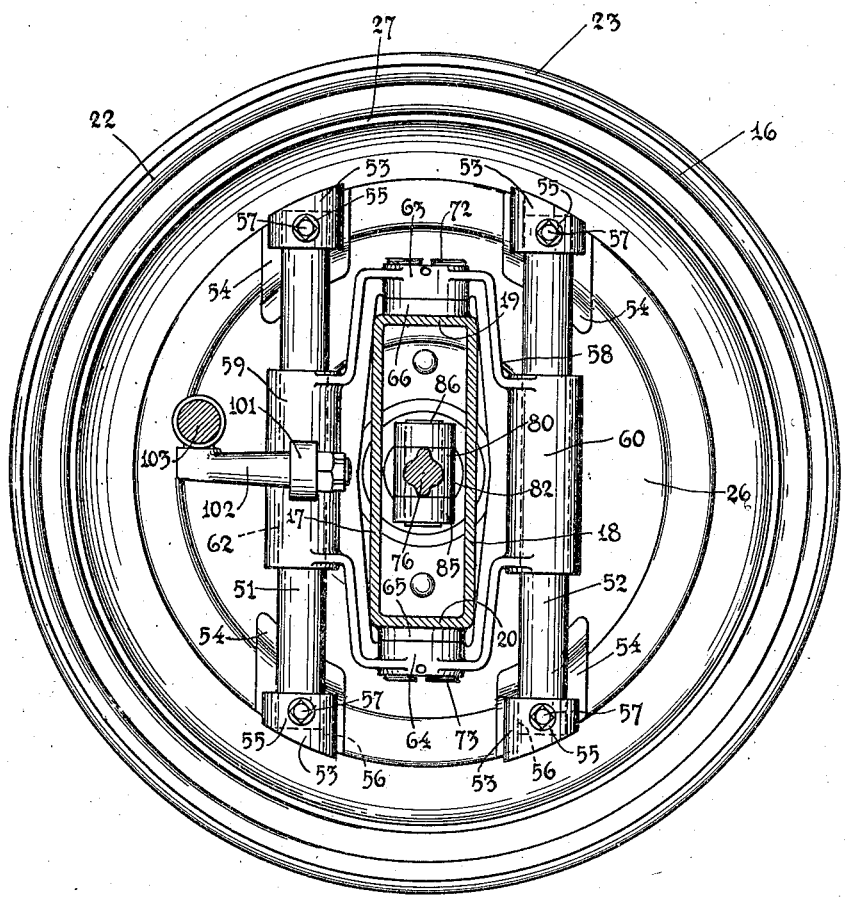

Patented Nov. 15, 1938

2,137,186

UNITED STATES PATENT OFFICE 2,137,186

VEHICLE CONSTRUCTION

Sterling O. Stageberg, Red Wing, Minn., assignor to Sterling Engineers, Inc., Red Wing, Minn., a corporation of Minnesota Application February 19, 1934, Serial No. 711,874

12 Claims. (Cl. 267—20)

My invention relates to vehicle construction and particularly to the type of construction by means of which the vehicle chassis is resiliently supported with respect to the wheels of the vehicle.

An object of the invention resides in providing a construction in which independent action of the front wheels may be procured.

Another object of the invention resides in providing a construction in which the wheel support is guided for up and down movement relative to the vehicle frame through means other than those upon which the spring of the vehicle acts.

A feature of the invention resides in employing a guide for guiding the wheel of the vehicle for vertical sliding movement.

Another object of the invention resides in providing an arm pivoted to the frame of the vehicle and engaging the wheel support and in further providing a spring acting between said arm and the frame of the vehicle.

A feature of the invention resides in providing the vehicle frame with a transverse frame member to which said arm is pivoted and against which the spring reacts.

An object of the invention resides in providing a member pivotally connected to the end of said transverse frame member through a hinge having a substantially vertical axis and by means of which the steering wheels of the vehicle are steered.

A still further object of the invention resides in disposing the guide means between said hinged member and the wheel support.

An object of the invention resides in constructing said guide with two spaced posts straddling said frame member and in further constructing the hinged member with bosses slidable along said posts.

Another object of the invention resides in constructing said arm jointed and in forming the same with a pivot having an axis extending in substantial alignment with the axis of said hinge.

A feature of the invention resides in connecting said arm to the wheel support at a position substantially in the medial plane of the wheel.

An object of the invention resides in constructing said transverse frame member tubular and in disposing the arm and spring within said transverse frame member.

Other objects of the invention reside in the novel combination and arrangement of parts and in the details of construction hereinafter illustrated and/or described.

In the drawings:

Fig. 1 is a front elevational view of a portion of the frame of a vehicle on which the two steering wheels of the vehicle are mounted and illustrating my invention applied thereto.

Fig. 2 is a plan view of the structure shown in Fig. 1.

Fig. 4 is an elevational sectional view similar to Fig. 3 and taken on line 4—4 of Fig. 2.

Fig. 5 is an elevational sectional view taken on line 5—5 of Fig. 4.

Figure 3:
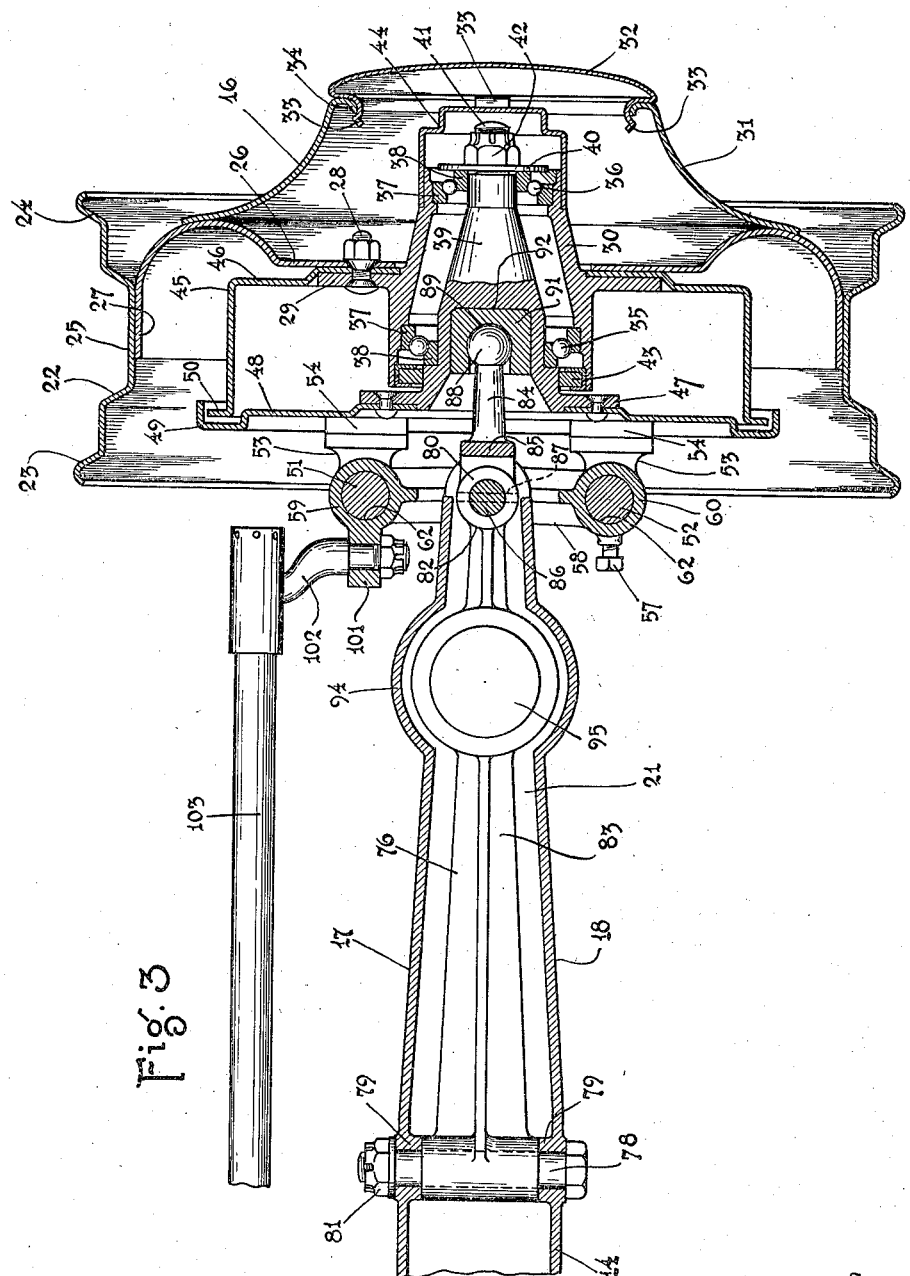
Fig. 3 is a plan sectional view taken on line 3—3 of Fig. 1 and drawn to a larger scale.

Inasmuch as my invention relates principally to the supporting of the chassis of the vehicle upon the wheels thereof the body of the vehicle proper has not been shown and only a portion of the chassis has been illustrated. It can, however, be readily comprehended that the construction shown can be applied to different types of vehicle frames and utilized in various different ways.

For the purpose of illustration, a portion of the chassis of the vehicle has been illustrated which is designated by the reference numeral 10. Of this chassis only a part of the frame 11 is shown which comprises longitudinal frame members 12 and 13. These frame members are connected together at the forward end thereof through a transverse tubular frame member 14 which takes the place of the usual front axle employed with motor vehicles and extends outwardly beyond the longitudinal frame members. This frame member has mounted at the ends thereof two steering wheels 15 and 16 which are identical in construction. For this reason only the wheel 16 and parts associated therewith will be described in detail.

The transverse frame member 14 is preferably rectangular in cross section, being of rather shallow depth at the center thereof and gradually increasing in depth towards the ends of the same. This frame member consists of front and rear walls 17 and 18, an upper wall 19 and a lower wall 20. The walls 17 and 18 are substantially parallel throughout the major portion of the frame member whereas the walls 19 and 20 diverge at the outer ends thereof to form flaring compartments 21 at the ends of the same.

The wheel 16 of the vehicle consists of a rim 22 constructed in the usual manner with flanges 23 and 24 at the outer edges thereof and with a recessed portion 25 at the center of the same. A tire 99 of ordinary construction is carried by said rim. The rim 22 has connected to it a disk 26 which is formed with an inwardly turned flange 27 lying along the portion 25 of the rim and secured thereto. The disk 26 is adapted to be secured through a number of bolts 28 to a flange 29 formed on a hub 30. The bolts 28 are preferably of a detachable nature so that the wheel can be detached from the hub for the purpose of changing tires whenever the occasion demands. As many bolts 28 may be employed as found necessary. The wheel 16 is formed with an outwardly flaring guard 31 which is welded, riveted or otherwise secured to the disk 26. This guard is constructed with a central opening adapted to be closed through a cap 32. Cap 32 may be removably held in position with respect to said guard through a number of fingers 33 frictionally engaging an inwardly turned flange 34 formed on said guard. When it is desired to remove the wheel the cap 32 is first removed and access may be had to the various bolts 28.

The hub 30 carries two ball bearings 35 and 36, one race 37 of each of said ball bearings being mounted in the hub 30 and the other race 38 of each of said ball bearings being attached to a stub axle 39 forming a support for the wheel 16 and hereinafter referred to as the wheel support of the vehicle. The ball bearings 35 and 36 are preferably designed to resist combined end thrust and radial stresses and are held in position with respect to the hub and stub axle through a washer 40 mounted upon a reduced threaded end 41 of said stub axle through a nut 42 threaded thereon. An oil retainer 43 disposed between the hub 30 and stub axle 39 prevents leakage of oil or grease from the bearings at the inner end of the hub while a cap 44 mounted upon the outer end of the hub 30 serves to prevent leakage of grease from the other end of the hub.

The hub 30 has attached to it a brake drum 45 which is provided with a plate-like member 46 extending inwardly from the drum proper and secured to the flange 29 of hub 30. Any desired brake mechanism of the internal expanding type may be employed in conjunction with the brake drum 45. Such construction not forming any particular feature of the present invention has not been shown in the drawings, though it can be readily comprehended that any of the standard types of brake means may be utilized.

The outer end of the stub axle 39 is provided with a flange 47 which is disposed in proximity to the plane of the outer edge of the brake drum 45. This flange has attached to it a disk 48 which extends past the edge of the drum 45 and serves to enclose the open end of said brake drum. The brake drum 45 and the disk 48 may be constructed with cooperating lips 49 and 50 by means of which the entry of dirt into the brake drum is greatly reduced.

The wheel supporting structure which includes the stub shaft 39 and the plate 48 attached to the flange 47 thereof carries a device for guiding the wheel 16 for substantial vertical movement relative to the transverse frame member 14. This structure includes two posts 51 and 52 which are secured at their ends in mountings 53 carried by the plate 48. These mountings are provided with bases 54 which rest upon and are attached to the plate 48 through welding, riveting or otherwise. These mountings further include bosses 55 which are constructed with bores 56 adapted to receive the ends of said posts 51 and 52. The posts are held in position within said bores through set screws 57 which are threaded into the bosses 55 and which pass through the ends of the said posts. By means of this construction the posts may be removed when desired for the purpose of repair or renewal.

Slidably mounted on the posts 51 and 52 is a yoke 58 which embraces the end of the frame member 14. This yoke is constructed with two bosses 59 and 60 which are bored as indicated at 62 to receive the posts 51 and 52. By means of this construction the yoke is guided for substantially vertical movement relative to the wheel supporting structure previously referred to.

For the purpose of steering the wheel 16 with respect to the frame of the vehicle a hinge connection is provided between the yoke 58 and the end of the frame member 14. This hinge construction utilizes two bearings 67 and 68 which take the place of the usual steering wheel spindles found on ordinary vehicles. These parts will now be described in detail. The yoke 58 is constructed at the upper and lower ends thereof with bosses 63 and 64 and the upper walls 19 and 20 of the frame member 14 are similarly constructed with bosses 65 and 66. The bosses 65 are provided with sockets 69 which are adapted to receive races 71 of ball bearings 67 and 68. The bosses 63 and 64 are internally threaded to receive plugs 72 and 73 which are provided with sockets 74 which receive the other races 75 of the said ball bearings. These plugs may be adjusted through the threads thereof to cause the races to properly engage the balls and to support the yoke 58 for swinging movement about a substantially vertical axis. The two ball bearings 67 and 68 form a hinge for the yoke 58 by means of which the wheel 16 may be swung for the purpose of steering the vehicle.

To support the vehicle proper an arm 76 is provided which is disposed within the compartment 21 of the tubular frame member 14. This arm is constructed with a boss 77 at one end which is journaled on a bolt 78 extending through the two walls 17 and 18 of the transverse frame member 14. The walls 17 and 18 are provided with short bosses 79 through which the bolt 78 extends and a nut 81 screwed upon the end of the bolt holds the bolt assembled and retains the arm 76 in proper position for vertical swinging movement.

The arm 76 is jointed near its other ends through a joint 82 which is constructed with a vertical axis arranged substantially in alignment with the axis of the two bearings 67 and 68. By means of this construction the arm 76 is divided into a section 83 which is directly pivoted to the frame proper and another short section 84 which extends into the wheel 16. The joint 82 is constructed in the following manner: On the end of section 83 of arm 76 is formed a boss 80. A fork 85 formed on the end of the arm section 84 straddles the boss 80. A shaft 86 extends through the fork 85 and the boss 80 and forms the pintle of the joint. This shaft is preferably secured to the boss 80 through a pin 87. The extreme end of the arm section 84 is provided with a ball 88. This ball is seated in a cylindrical cavity 89 formed in a rubber block 91. Said block is received in a socket 92 formed in the end of the stub axle 39. The parts of the invention are so arranged that the center of the ball 88 lies substantially in the medial plane of the wheel 16.

Operating in conjunction with the section 83 of arm 76 is a compression coil spring 93 which is contained within a tubular housing 94 formed on the upper wall 19 of the frame member 14. This spring rests at its lower end upon a seat 95 formed on the section 83 of arm 71. The housing 94 is open at its upper end and is threaded to receive a cap 96. This cap is constructed with a socket 97 which forms a seat for the other end of the spring 93. By means of the cap 96 the pressure of the spring 93 on the arm 76 may be varied so that when the vehicle is normally loaded the bosses 59 and 60 are midway between the mountings 53.

In order to turn the steering wheels 13 the yokes 58 are constructed with lugs 101 which are threaded to receive arms 102 projecting outwardly therefrom. A tie rod 103 connects the two arms 102 together. By means of the usual steering post and steering wheel, which have not been illustrated, the wheels may be turned regardless of their position relative to the frame member 14.

The operation of the invention is as follows: Assuming the parts of the vehicle to be in positions shown in Figs. 1 and 4. If the tire 99 on wheel 16 engages an upwardly extending projection in the road on which the vehicle is traveling, pressure is applied to the underside of the tire 99 which tends to raise the wheel 16. This causes the two posts 51 and 52 to slide upwardly along the bores 62 formed in the bosses 59 and 60 of yoke 58. Such sliding motion is, however, resisted through the action of the arm 76 and the spring 93. Movement of the wheel 16 upwardly causes the said spring to compress and the excess energy is momentarily stored in said spring and released after the wheel passes the obstruction. While this is occurring the upward pressure of the wheel tends to raise the entire vehicle chassis through the spring 93 due to the fact that the arm 76 engages said spring and due to the fact that said spring further engages the frame proper. The seat 95 of the arm 76, however, serves as a fulcrum for the arm 76 and the force exerted on the ball 88 of said arm also tends to swing said arm about said fulcrum which would have a tendency to lower the frame member 14 through the action of the arm upon the bolt 78. This tendency to both move the frame upwardly and downwardly would hence cause a certain part of the energy applied to the chassis through the upward movement of the wheel to be neutralized thereby greatly reducing the movement of the chassis proper. By arranging the axis of the joint in the arm 76 in alignment with the axis of the hinge serving as the wheel spindle the action of the device is the same regardless of the positions of the wheel brought about through the steering of the vehicle. Due to the fact that the connection between the arm 76 and the wheel support is in the medial plane of the wheel no lateral stresses whatsoever are applied to the posts 51 and 52 and the bosses 59 and 60. These parts hence slide freely and without appreciable wear.

With my invention independent action of the two steering wheels of a vehicle can be procured. With my invention coil springs may be substituted in place of the conventional leaf springs used in vehicles. By placing the joint in the spring arm at the particular locality designated the action of the device is the same regardless of the position of the steering wheels. Due to the fact that the connection of the spring arm to the wheel mounting is situated in the medial plane of the wheel, no binding or lateral stresses occur in the guides. With my invention the spring arm and spring are wholly confined within the tubular frame member so that the same are fully protected from injury. My invention provides an extremely neat and attractive construction which enhances the appearance of the vehicle equipped with the same.

Changes in the specific form of my invention, as herein disclosed, may be made within the scope of what is claimed without departing from the spirit of my invention.

Having described my invention, what I claim as new and desire to protect by Letters Patent is:

1. In combination with the frame and the support for the wheel of a vehicle, said frame including a tubular frame member extending transversely of the vehicle, an arm disposed wholly within said tubular frame member, means carried by said frame member forming a horizontal pivot for said arm, and restraining said arm from swinging about a vertical axis, a vertically disposed coil spring acting between said arm and frame member and urging said arm downwardly, said arm engaging said wheel support, and means connected to said wheel support and to said frame member and supporting said wheel for up and down movement relative to the frame.

2. In combination with the frame and the support for the wheel of a vehicle, said frame including a frame member having two spaced parallel walls, an arm pivoted to said walls and swingable therebetween in an up and down direction, a spring attached to said frame member and movable between said walls for urging said arm downwardly, said arm being connected to said wheel support, and means connected to said wheel support and to said frame member and guiding said wheel for up and down movement relative to the frame member.

3. In combination with the frame and the support for a wheel of a vehicle, two vertically extending spaced posts attached to said wheel support, a yoke extending across said posts and having bosses slidable along the same, a single frame member for connecting said yoke to said frame and resilient means between said wheel support and said frame member.

4. In combination with the frame and the support for a wheel of a vehicle, said frame including a transverse frame member extending up toward said wheel support, two verticaly extending posts attached to said wheel support and straddling said frame member, a yoke having bosses slidable along said posts, means for pivotally connecting said yoke to said transverse frame member, and resilient means acting between said wheel support and said transverse frame member.

5. In combination with the frame and the support for a wheel of a vehicle, said frame including a transverse frame member extending up toward said wheel support, two vertically extending posts attached to said wheel support and straddling said frame member, a yoke having bosses slidable along said posts, means for pivotally connecting said yoke to said transverse frame member, an arm pivoted to said transverse frame member and connected to said wheel support and a spring acting between said frame member and said arm.

6. In combination with a frame and support for a wheel of a vehicle, said support having a socket therein situated at the medial plane of the wheel, an arm pivoted to said frame and having a part seated within said socket, means connected to said wheel support and to said frame and guiding said wheel for up and down movement relative to the frame, and resilient means acting between said arm and frame.

7. In combination with the frame and the support for a wheel of a vehicle, means connected to said wheel support and to said frame and guiding said wheel for up and down movement relative to the frame, said means including a steering wheel spindle, an arm pivoted to said frame and connected to said wheel support, said arm being constructed with a joint therein having a hinge disposed with the axis thereof substantially in alignment with the axis of said steering wheel spindle.

8. In combination with the frame and the support for a wheel of a vehicle, a guide secured to said wheel support, a member movable along said guide for procuring up and down movement between said wheel and frame, means providing a hinge having a substantially vertical axis for connecting said member to said frame, an arm pivoted to said frame through a pivot having a substantially horizontal axis, said arm being provided with a joint having a hinge constructed with a substantially vertical axis in alignment with the axis of said member, the end of said arm being connected to said wheel support, and resilient means acting between said arm and said frame.

9. In combination with the frame and the support for a wheel of a vehicle, said frame comprising a transverse frame member extending up toward the wheel support, a member pivoted to said transverse frame member through a hinge having a substantially vertical axis, means connected to said member and to said wheel support for guiding said wheel for up and down movement relative to the transverse frame member, an arm pivoted to said transverse frame member and connected to said wheel support, said arm having a joint therein provided with a hinge having a substantially vertical axis in substantial alignment with the axis of the hinge of said member, and resilient means acting between said arm and said transverse frame member.

10. In combination with the frame and the support for a wheel of a vehicle, said frame comprising a transverse frame member extending up toward the wheel support, a member pivoted to said transverse frame member through a hinge having a substantially vertical axis, means connected to said member and to said wheel support for guiding said wheel for up and down movement relative to the transverse frame member, an arm pivoted to said transverse frame member and connected to said wheel support, said arm having a joint therein provided with a hinge having substantially vertical axis in substantial alignment with the axis of the hinge of said member, and resilient means acting between said arm and said transverse frame member, said arm being provided with a pivotal connection to said wheel support situated substantially in the medial plane of the wheel.

11. In combination with the frame and the support for a wheel of a vehicle, guide means between the wheel support and frame for guiding the same for relative movement with respect to one another and in a vertical direction, means providing a hinge having a substantially vertical axis for connecting said wheel support to said frame, an arm pivoted to said frame on one side of said guide means and being connected to said wheel support on the other side of said guide means, said arm having a joint with a vertical axis disposed substantially in alignment with the axis of said hinge and resilient means acting between said arm and frame and disposed intermediate said pivot and the guide means.

12. In combination with the frame and the support for a wheel of a vehicle, guide means connected to said wheel support and frame and guiding said wheel support and frame for relative vertical movement, an arm pivoted to said frame at one end and pivoted to said wheel support at its other end, said last named pivot being disposed substantially in the medial plane of the wheel, and resilient means acting between said arm and frame.

STERLING O. STAGEBERG.